Sept. 25, 1928.
J. R. JEWETT, JR
1,685,233
DISHPAN HOLDER FOR SINKS
Filed May 12, 1927
2 Sheets-Sheet 1
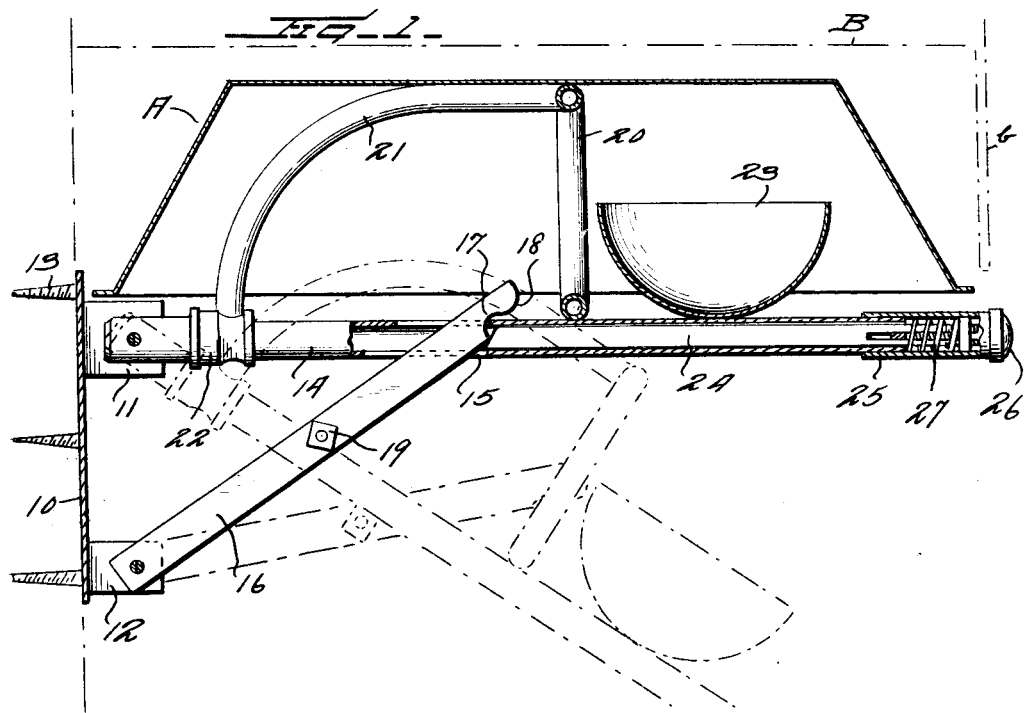
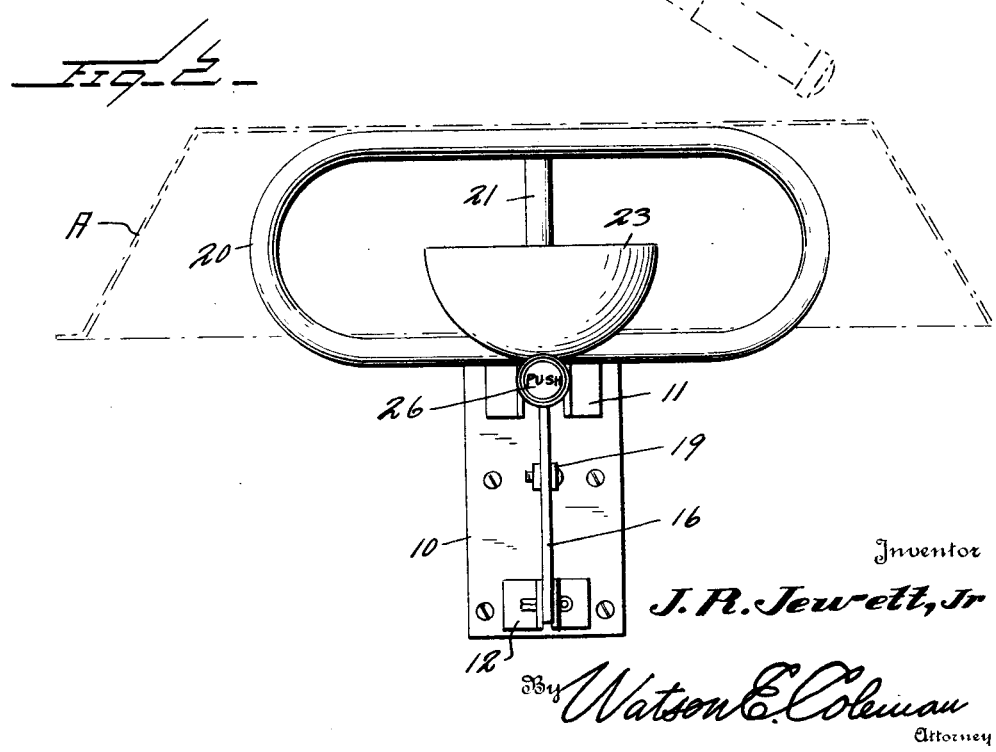
Inventor
J. R. Jewett, Jr
By Watson E. Coleman
Attorney Sept. 25, 1928.  J. R. JEWETT, JR  1,685,233
DISHPAN HOLDER FOR SINKS
Filed May 12, 1927  2 Sheets-Sheet 2
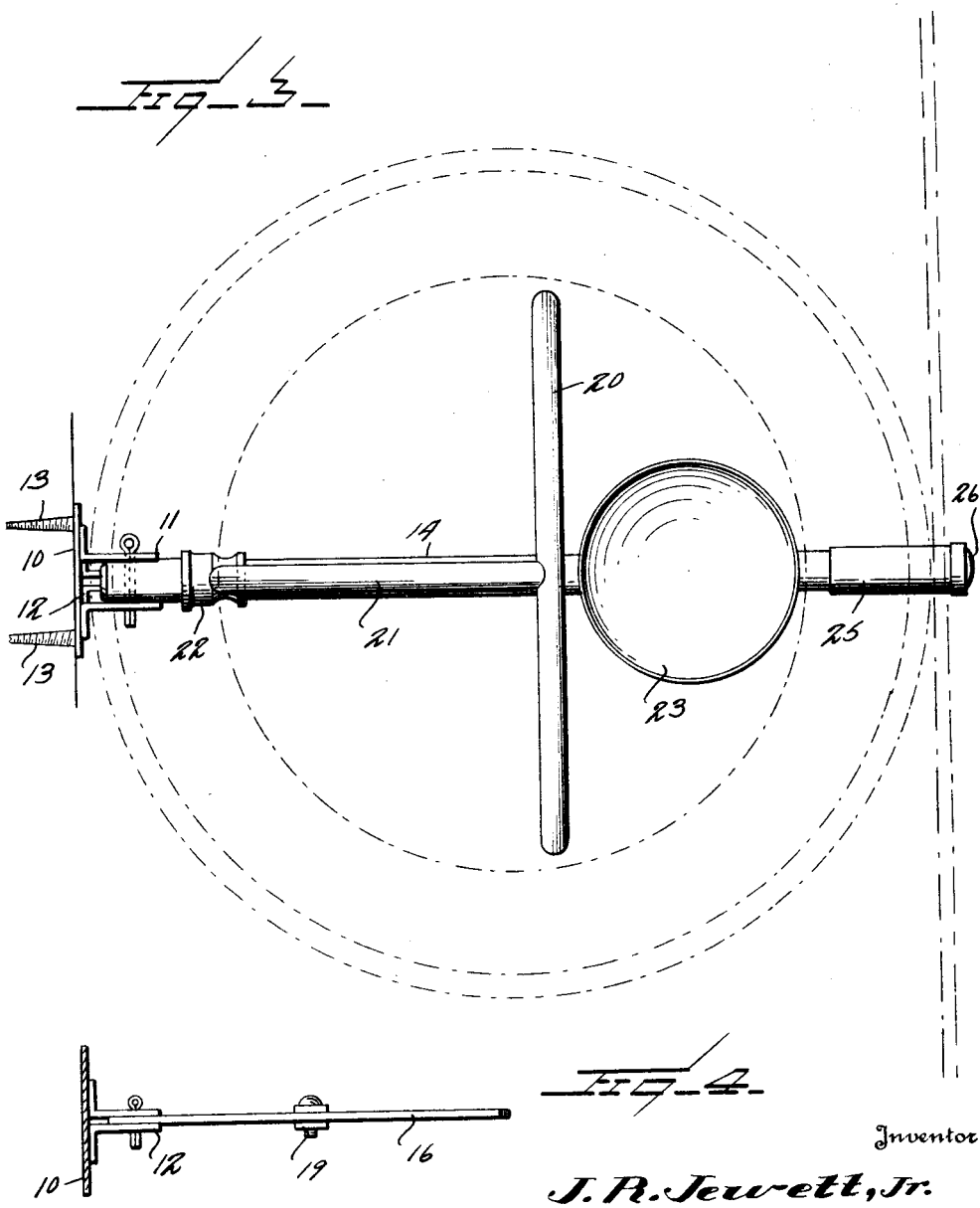

Patented Sept. 25, 1928.

1,685,233

UNITED STATES PATENT OFFICE.

JOHN R. JEWETT, JR., OF GRAND ISLAND, NEBRASKA.

DISHPAN HOLDER FOR SINKS.

Application filed May 12, 1927. Serial No. 190,930.

This invention relates to devices for supporting dish pans beneath sinks and the general object of the invention is to provide a dish pan support which is adapted to be mounted beneath the bottom of a sink and rearward of the apron thereof, and which is so constructed that it will support the dish pan to a resting position beneath the sink and practically concealed, the support being so made that it may be released to swing downward a limited distance and carry the dish pan to a position where it may be readily removed.

A further object is to provide a device of this character with a bowl or holder for dish cloths or the like.

My invention is illustrated in the accompanying drawings, wherein:—

Figure 1 is a side elevation of my dish pan support partly in section;

Figure 2 is a front elevation thereof, the dish pan being shown in dotted lines;

Figure 3 is a top plan view thereof, the dish pan being shown in dotted lines;

Figure 4 is a top plan view of the latching brace.

Referring to these drawings, it will be seen that my device comprises a bracket 10 having outwardly projecting ears 11, the bracket being in the form of a plate and having a lower pair of ears 12. The bracket is held to the wall by means of the screws 13 or like devices. Pivotally mounted upon the bracket is the outwardly projecting tubular arm 14. This is made of ordinary pipe, this arm being formed with a slit 15, the slit extending entirely through the pipe. Pivoted upon the bracket 12 is a supporting brace 16 of strap iron, the outer end of which is formed with a recess 17 and a protuberant or curved portion 18 beyond the recess. This brace is adapted to extend through the slot 15 and the shoulder or inner end wall of the recess 17 is adapted to engage against the upper wall of the slit 15 when the brace is in the position shown in Fig. 1. A bolt, screw, pin or other like member 19 passes through the brace and constitutes a stop. When the brace is in the position shown in Figure 1, the arm 14 is held in a horizontal position. When the brace is released from its engagement with the arm, the arm will drop until the arm strikes the stop 19 when the arm will be supported in a downwardly and forwardly directed position. Carried upon the arm midway of its ends is the transversely extending elliptical frame 20 which may be made of steel tubing or like material, and connecting the upper cross bar of this frame with the rear end of the arm is a downwardly and rearwardly curved member 21 which is illustrated as screwed to a coupling 22 which has screw-threaded engagement with the two sections of which the arm is formed. This member 21 is also preferably of steel tubing, though I do not wish to be limited to this. The member 21 constitutes a guide for the dish pan A.

Mounted upon the arm 14 is a dish cloth holder 23 of sheet metal and preferably bowl-shaped. Extending longitudinally through the pipe which constitutes the arm 14 is a plunger rod 24 which projects out at the end of the arm and is connected to a slidable cap 25 formed with a push button 26 inserted at its extreme end. This cap and therefore the plunger rod is urged outward by means of the coiled compression spring 27. Assuming that the dish pan support is raised to a horizontal position, then the brace 16 will be engaged with the arm at its upper end and will hold the arm in its horizontal raised position. By pushing inward on the plunger cap 25, the plunger rod will force the brace rearward and release the arm which will then fall to the position shown in dotted lines in Figure 1, and the dish pan may be readily removed. When the arm 14 is lifted up from its downwardly inclined position to a horizontal position, it will automatically latch by engagement with the upper end of the latching brace 16 in an obvious manner.

The bracket 10 is mounted upon the wall beneath the sink B and slightly below the level of the lower edge of the apron b. When the arm is raised, the dish pan A will be supported entirely beneath the sink, and practically concealed by the apron and will thus occupy space which is ordinarily wasted. The only part which will project below the level of the apron will be the arm 14. When raised the push button 26 will be disposed just below the level of the apron and approximately flush therewith so as to be in a convenient position for use.

Care need not be taken when placing a pan on this pan holder as the curve of the guide 21 will naturally shift the pan into a proper position of rest. Then by lifting up on the arm 14 until it is engaged with the latching brace, the pan will be raised into a position beneath the sink and will be supported there until such time as it is needed. When releasing the pan holder, it is only necessary to push inward on the button 26 and the pan holder will drop to its downwardly inclined position which permits the pan to be readily removed.

This pan holder is designed to be placed under any make of sink and obviously may be modified in many ways without departing from the spirit of the invention.

I claim:—

1. A pan holder of the character described including a bracket, an arm pivoted to the bracket, an upwardly projecting frame mounted upon the arm and conforming more or less to the shape of an inverted dish pan and adapted to support the same, a latching brace pivoted to the bracket and adapted at its upper end to operatively engage said arm and hold the arm in a raised position, a plunger operating through the arm and adapted to release the engagement between the brace and the arm, a spring urging the plunger outward, and a push button on the extremity of the arm whereby the plunger may be shifted rearward against the action of the spring.

2. A pan holder of the character described including a bracket, an arm pivoted to the bracket, an upwardly projecting frame mounted upon the bracket and conforming more or less to the shape of an inverted dish pan and adapted to support the same, a latching brace pivoted to the bracket and adapted at its upper end to operatively engage said arm and hold the arm in a raised position, a plunger operating through the arm and adapted to release the engagement between the brace and the arm, a spring urging the plunger outward, a push button on the extremity of the arm whereby the plunger may be shifted rearward against the action of the spring, and a stop carried by the latching brace and limiting the downward movement of the arm.

3. A support for dish pans comprising a bracket, a tubular arm pivoted upon the bracket and vertically slotted midway of its length, a dish pan supporting the frame extending upward from the arm and carried thereby and adapted to receive an inverted dish pan and support the same, a latching brace pivoted upon the bracket and having its upper end extending through said slot, the upper end being notched to engage the forward wall of the slot, said brace having a stop midway of its length, a plunger rod extending through the forward end of the arm, and having a push button at its outer end, a spring urging the plunger rod outward, the plunger rod when shifted inward shifting the latching brace out of engagement with the arm to thereby permit the arm to drop until it strikes said stop.

4. A dish pan holder of the character described including a bracket, an arm pivoted upon the bracket, a frame projecting upward from the arm and approximately conforming to the shape of an inverted dish pan, means for latching the arm in a raised position and means for releasing the said latching means including a push button mounted upon the forward end of the arm.

5. A structure of the character described including a bracket, an arm pivoted thereto for vertical movement, a brace pivotally mounted upon the bracket and engaging said arm, a latch carried by the arm and engaging the brace to thereby hold the arm in a raised position, and a push button carried by the arm at its outer end and operatively engaging said latch.

In testimony whereof I hereunto affix my signature.

JOHN R. JEWETT, Jr.